United States Patent
Douglas et al.

(10) Patent No.: US 11,748,233 B2
(45) Date of Patent: Sep. 5, 2023

(54) DEBUGGING A NATIVE COMPILED APPLICATION FROM AN INTEGRATED DEVELOPMENT ENVIRONMENT

(71) Applicant: Red Hat, Inc., Raleigh, NC (US)

(72) Inventors: Stuart Douglas, Orange (AU); Jason Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/863,224

(22) Filed: Apr. 30, 2020

(65) Prior Publication Data

US 2021/0342252 A1 Nov. 4, 2021

(51) Int. Cl.
*G06F 9/44* (2018.01)
*G06F 11/36* (2006.01)

(52) U.S. Cl.
CPC ................ *G06F 11/3636* (2013.01)

(58) Field of Classification Search
CPC .................................................. G06F 11/3636
See application file for complete search history.

(56) References Cited

U.S. PATENT DOCUMENTS

| | | | | |
|---|---|---|---|---|
| 10,846,197 B1* | 11/2020 | Bluestein | ............ | G06F 11/3664 |
| 2001/0005852 A1* | 6/2001 | Bogle | ................ | G06F 11/3664 714/E11.21 |
| 2005/0010678 A1* | 1/2005 | Pugh | ..................... | G06F 11/362 709/232 |
| 2005/0028147 A1* | 2/2005 | Bonilla | ............... | G06F 9/45504 717/134 |
| 2007/0168985 A1* | 7/2007 | Konishi | ............. | G06F 11/3636 717/124 |
| 2007/0288910 A1* | 12/2007 | Bhat | ..................... | G06F 9/4488 717/140 |
| 2012/0304154 A1* | 11/2012 | Cabillic | .................... | G06F 8/20 717/124 |
| 2014/0366007 A1* | 12/2014 | Koltachev | ................ | G06F 8/53 717/129 |
| 2016/0246700 A1* | 8/2016 | Pechanec | ............ | G06F 11/3636 |

OTHER PUBLICATIONS

Galligan, "Debugging Kotlin Native's Compiler", DEV Community, May 26, 2019 (8 pgs.).
Weilaard, "F7 plan (gcj/java/eclipse/swt/java-gnome/fop/batik/etc)", Dec. 29, 2006 (12 pgs.).

* cited by examiner

*Primary Examiner* — Hang Pan
(74) *Attorney, Agent, or Firm* — K&L Gates LLP (57) ABSTRACT

A system includes a memory and processor in communication with the memory. The processor is configured to receive a connection request at an emulation layer from an integrated development environment (IDE). The emulation layer connects, via a socket connection, with the IDE. Using the socket connection, the emulation layer receives a command. The command is decoded to retrieve a parameter and a reference to a native application. The command is mapped to a native debugger command and then used to debug the native application using the native debugger.

20 Claims, 8 Drawing Sheets

DEBUGGING A NATIVE COMPILED APPLICATION FROM AN INTEGRATED DEVELOPMENT ENVIRONMENT

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for debugging native compiled applications from a Java integrated development environment (IDE). In an example, a method includes receiving a command at an emulation layer and converting the command from a first language to a native debugger command. Next, using the native debugger command, a native debugger executes the native application. When a response is received from the native debugger, the response is converted to the first language and outputted to the IDE.

In an example, a system includes a memory and a processor. The processor is in communication with the memory. The processor is configured to receive a connection request at an emulation layer from an integrated development environment (IDE). The emulation layer and the IDE are connected through a socket connection. Next, the emulation layer receives a command through the socket connection and decodes the command to retrieve a parameter and a reference to a native application. The command is mapped to a native debugger command and used to invoke a native debugger to execute the native application.

In an example, a non-transitory machine readable medium storing code, which when executed by a processor, is configured to receive a command at an emulation layer, via a socket connection. Next the command is decoded to retrieve a parameter and a reference to a native application. The command is mapped to a native debugger command and used to invoke a native debugger to execute the native application.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for debugging a native compiled application using an Integrated Development Environment (IDE) originally developed for interpreted programming languages. A push for moving applications into the cloud and emergent application development technologies, such as GraalVM and Quarkus, which allow programs written in interpreted languages (e.g., Java Applications) to be compiled down to native code, has highlighted a lack of viable debugging tools. Generally, commonly used debugging tools and protocols developed for interpreted programming languages (e.g., Java and C#) are limited in their ability to debug natively compiled applications. Typically, IDEs use debug protocols (e.g., the Java Debug Wire Protocol) that are unrecognizable by either a natively compiled application or a native debugger. Thus, to facilitate application development for cloud environments, the industry would benefit from innovations that bridge the gap.

As described in various examples disclosed herein, to advance development and debugging of natively compiled applications, the systems and methods disclosed herein advantageously create an emulation layer to facilitate debugging between an Integrated Development Environment (IDE) and a natively compiled application. An emulation layer may be able to intercept and/or receive debugging operations from an IDE and map them to commands for a separate native debugger, converting semantics of a first language (e.g., Java) into native semantics. For example, an application may be debugged using a Java IDE and Java Debug Wire Protocol (JDWP) even when the application is natively compiled into platform specific CPU instructions. The Java IDE can send the JDWP commands to an emulation layer, which, in turn, translates the JDWP commands into comparable native debugger commands (e.g. for the GNU Debugger or GDB) and executes the natively compiled application from the native debugger using the comparable native debugger commands. Conversely, any outputs from the native debugger can be translated back to a JDWP format by the emulation layer, which can be understood by the Java IDE. In this example, a generic Java IDE is enabled to seamlessly control and interact with the native debugging tools.

In various examples, an IDE may attach to an emulation layer using a socket. In these instances, the IDE may implement the use of various debugging tools, such as, but not limited to, breakpoints, back trace, printing, memory dumping, as well as being able to step through the native compiled application. Upon initiation of a debugging session, the emulation layer can invoke a native debugger using the translated commands. In some instances, responses from the native debugger can be mapped directly to the source code of the natively compiled application. For example, a breakpoint set in the natively compiled application will correspond to the location within the source code shown in the Graphical User Interface (GUI) of the IDE.

Figure 1:
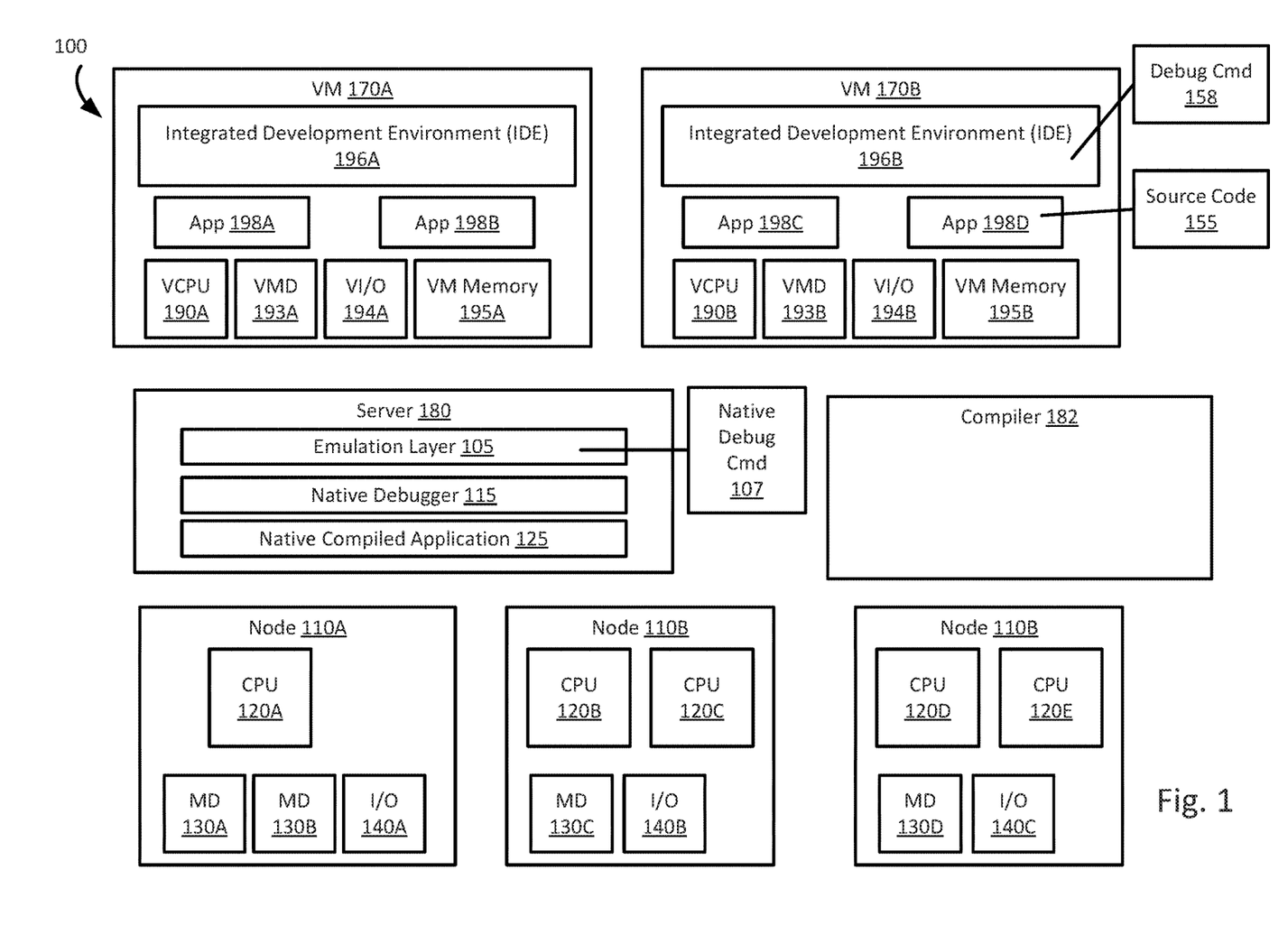
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 180, compiler 182, one or more virtual machines (VM 170A-B, 170 generally), and nodes (e.g., nodes 110A-C, 110 generally).

In various examples, a server 180 may include an emulation layer 105, native debugger 115, and a native compiled application 125. An Integrated development Environment (IDE) (196A-B, 196 generally) may debug the native compiled application 125. For example, the IDE 196 may connect to an emulation layer 105 to access a native debugger 115, which may debug the native compiled application 125. In these examples, debug commands 158 may be sent from the IDE 196 to the emulation layer 105. The emulation layer 105 may decode and/or map the received debug commands 158 to a native debugger command 107. The emulation layer 105 may invoke the native debugger 115 to execute the native compiled application 125 using one or more native debugging commands 107.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 193A, and a virtual input/output device 194A. Similarly, virtual machine 170B may include virtual machine memory 195B, a virtual CPU 190B, a virtual memory devices 193B, and virtual input/output device 194B. In an example, Applications 198A-D may be different applications or services. In another example, applications 198A-D may be different instances of the same application or service.

In various examples, each application 198 may include source code 155. In many instances, an application 198 may be compiled into a native compiled application 125. The native compiled application 125 may include native CPU instructions associated with the computer system 100. In various examples, the VM 170 may include an IDE 196 to debug applications 198 developed on each respective VM 170. As each application 198 finally compiled into a native compiled application 125, the IDE 196 may utilize the emulation layer 105 and native debugger 115 to debug the native compiled application. In an example, compiler 182 may compile source code 155 to create a native compiled application 125. In various examples, the source code 155 from application 198 may be written using an interpreted programming language (e.g., Java and C#).

In an example, a virtual machine 170A may execute a guest operating system and run applications 198A-B which may utilize the underlying VCPU 190A, VMD 193A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS. In an example embodiment, applications 198A-B run on a virtual machine 170A may be incompatible with the underlying hardware and/or OS. For example, applications 198A-B run on one virtual machine 170A may be compatible with the underlying hardware and/or OS while applications 198C-D run on another virtual machine 170B are incompatible with the underlying hardware and/or OS.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
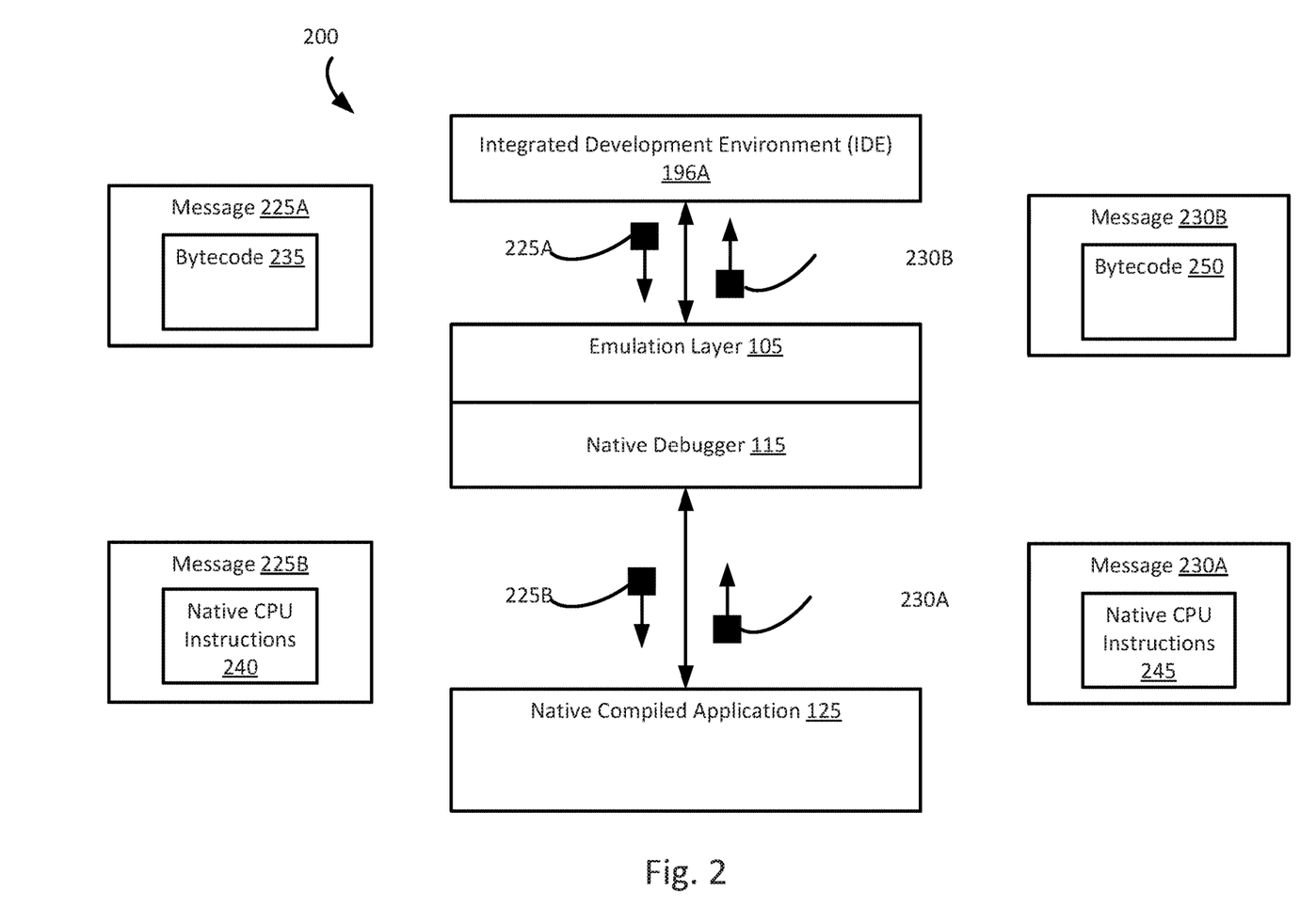
FIG. 2 illustrates a block diagram of an example Integrated development Environment (IDE) communicating with a native compiled application via an emulation layer, in accordance with an example embodiment of the present disclosure.

FIG. 2 depicts a block diagram of an example of a computer system 200 including an integrated development environment (IDE) debugging a native compiled application in accordance with one or more aspects of the present disclosure. As shown, the IDE 196A may debug the native compile application 125 via the emulation layer 105. For example, the IDE 196A connects to the emulation layer 105 using a socket connection to send and receive messages from the emulation layer 105. During debugging, the emulation layer 105 may invoke the native debugger 115 to execute the native compiled application 125.

Debug commands 158 may be sent from the IDE 196A to the native compiled application 125. For example, the IDE 196A can send a "retrieve data" command to the native compiled application 125 using message 225A. Message 225A includes bytecode 235 from IDE 196A. The emulation layer 105 receives message 225A and decodes the message 225A to determine which command was sent from the IDE 196A. In this instance, the command is bytecode 235. The emulation layer maps the bytecode 235 to one or more native CPU instructions 240 and uses the native debugger 115 to retrieve the requested data from the native compiled application 125 using message 225B. The native debugger 115 retrieves the data using message 230A, which includes native CPU instructions 245. The native debugger 115 provides the message 230A to emulation layer 105. The emulation layer 105 encodes the native CPU instructions 245 into bytecode 250 and incorporates it into message 230B. Next, emulation layer 105 sends the message 230B to the IDE 196A. As the message includes bytecode 250, the IDE 196A is able to interpret the message 230B and display the requested data.

Figure 3:
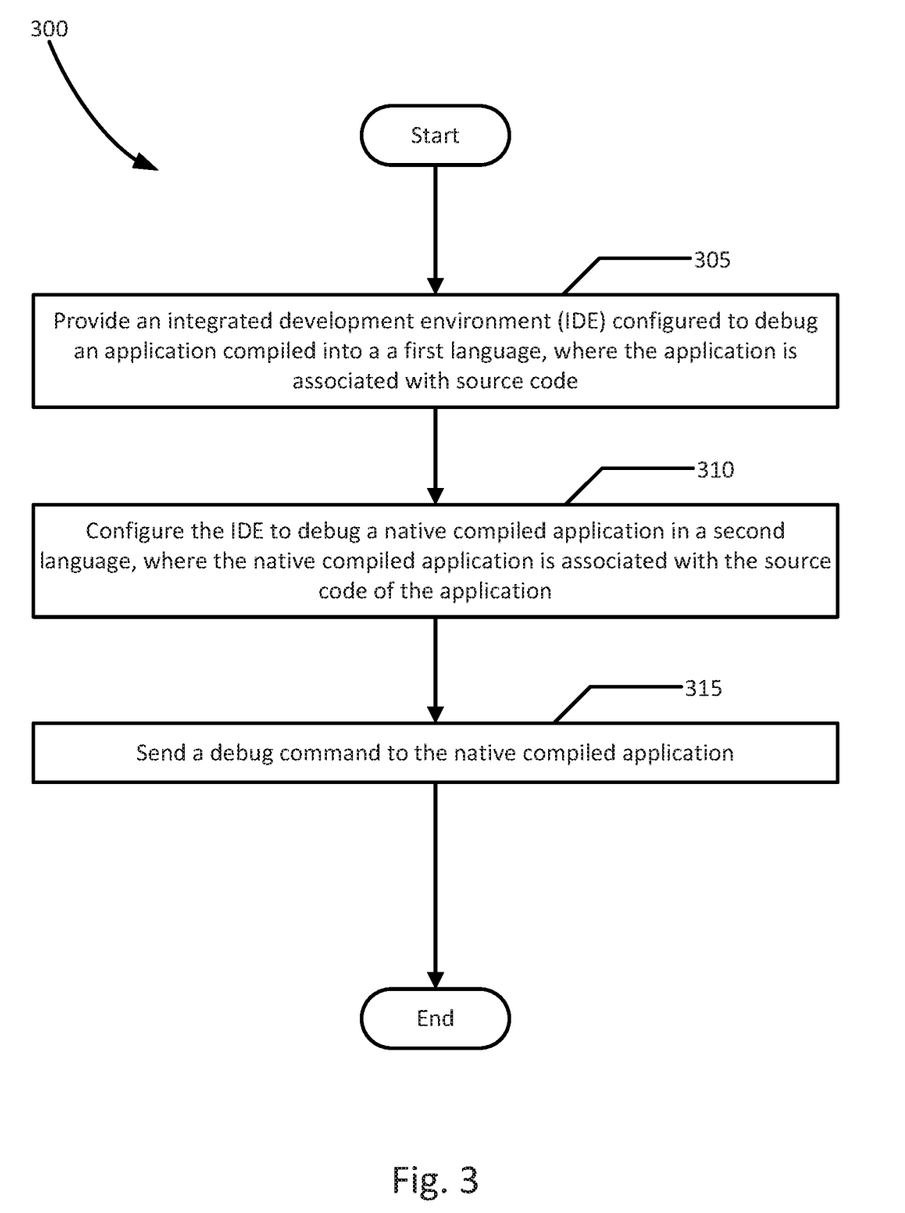
FIG. 3 illustrates a flowchart of an example method for debugging a native compiled application from an IDE according to an example embodiment of the present disclosure.

FIG. 3 illustrates a flowchart of an example method for debugging a native compiled application, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

As shown in FIG. 3, the computer system provides an integrated development environment (IDE) configured to debug an application compiled into a first language, where the application is associated with source code (Block 305). For example, VM 170B executes an IDE 196B to debug the native compiled application 125, where the IDE 196B is configured to debug applications developed and compiled in an interpreted programming language (e.g., Java and C#). In this instance, both the Application 198D and native compiled application 125 are compiled from source code 155. However, application 198D is compiled into an intermediary language (e.g., Java bytecode) and able to be run using a VM (e.g., a Java Virtual Machine), while the native compiled application 125 is compiled into native CPU instructions for the computer system 100. Next, the IDE is configured to debug the native compiled application in a second language, where the native compiled application is associated with the source code of the application (block 310). For example, an IDE 196B may instantiate an emulation layer 105 configured to translate between a first language and a second language (e.g., between Java bytecode and native CPU instructions). In some instances, the IDE 196B may be able to set the first language and second language depending on the development environment. In various instances, the IDE 196B connects to the emulation layer 105 using a socket connection. In various examples, the IDE 196B provides the emulation layer 105 with a debugger command 158, a reference to the native compiled application 125 and redirects debugging output from the IDE 196B to the emulation layer 105.

During debugging, the IDE sends a debug command to the native compiled application (Block 315). For example, during debugging, the IDE 196B utilizes a multitude of debugging commands, such as, but not limited to, setting break points, retrieving data, mapping memory, and/or stepping through each line of the source code 155. The IDE 196B is able to send a debug command 158 to debug the native application 125. The IDE 196B sends the debug command 158 to the emulation layer 105, which translates the debug command 158 into native debug command 107. The IDE 196B executes a native debugger 115 with the native debug command 107 to debug native compiled application 125. In various examples, the emulation layer 105 receives a response from native debugger 115 related to the native debug command 107, such as a response to a "data request". The emulation layer 105 is able to translate the response into an intermediary language able to be understood by the IDE 196B (e.g., native CPU instructions converted into Java bytecode).

Figure 4:
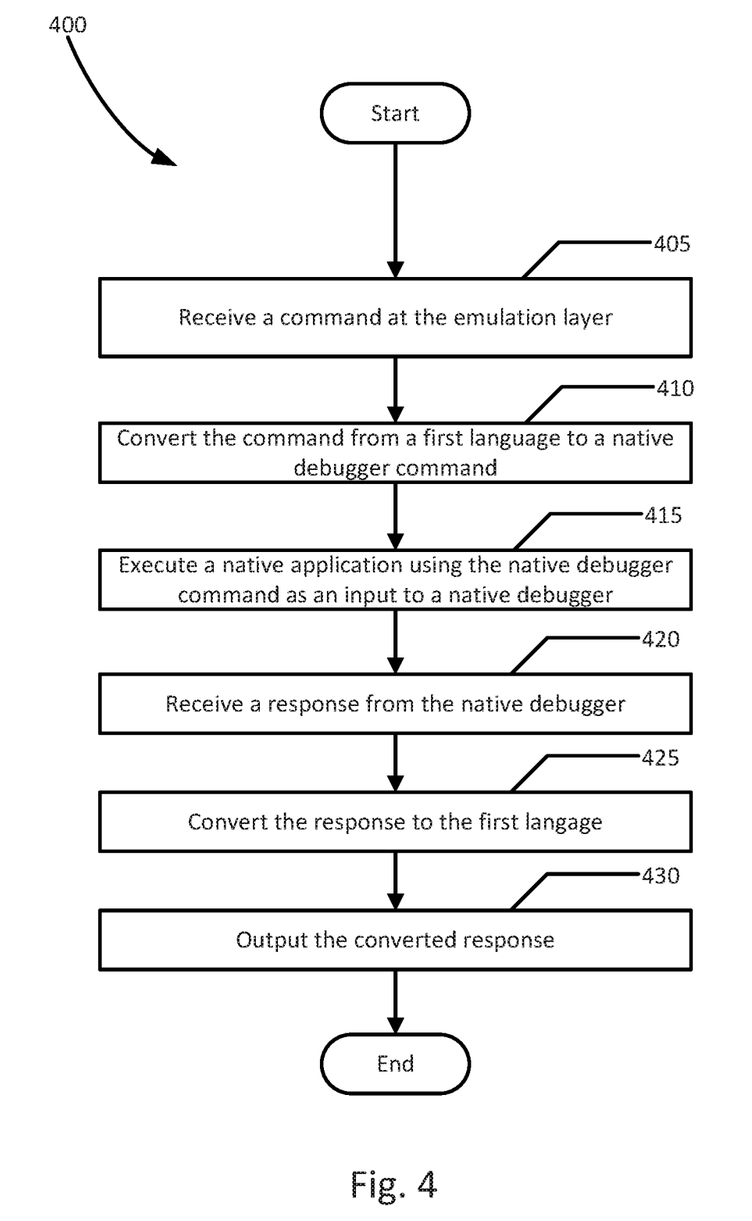
FIG. 4 illustrates a flowchart of an example method of processing debugging commands at an emulation layer configured to debug a native compiled application, in accordance with an embodiment of the present disclosure.

FIG. 4 illustrates a flowchart of an example method of processing debug commands at an emulation layer for a native compiled application, in accordance with an embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated and some of the blocks described are optional. The method 400 may be performed by processing logic that may comprise hardware (circuitry, dedicated logic, etc.), software, or a combination of both.

As shown, an emulation layer is able to receive debug commands (Block 405). For example, an emulation layer 105 facilitates debugging of a native compiled application 125 by sending and/or receiving debug commands 158 from an Integrated Development Environment (IDE) 196B. The emulation layer converts the command from a first language to a native debugger command (Block 410). For example, the emulation layer 105 decodes the debug command 158 to retrieve a parameter and a reference to a native compiled application 125. The emulation layer 105 then maps the debug command 158 to a native debug command 107 (e.g., Java bytecode to native CPU instructions). In various examples, the debug command 158 may be a request to set a "break point" at a location specified by parameters included within the debug command 158. In some examples, the debug command 158 may be a request for data at a location specified by parameters included within the debug command 158.

Next the emulation layer executes the native application using the native debugger command as an input for the native debugger (block 414). For example, the emulation layer 105 uses the native debugger 115 and the native debug command 107 to execute the native compiled application 125. In various instances, the native debug command 107 may be a request for data from a specified location in memory of the native compiled application 125. Next, the emulation layer receives a response from the native debugger (block 420) and converts the response to the first language (block 425). For example, the emulation layer 105 receives a response from the native debugger 115 written using native CPU instructions. The emulation layer 105 converts the native CPU instructions back to the first language. In this instance, the first language is Java bytecode. Next, the emulation layer outputs the converted response (Block 430). For example, once the response is converted back into the first language (e.g., Java bytecode), the emulation layer 105 outputs the response to the IDE 196B. In various instances, the IDE 196 is able to display the response along side the source code 155.

Figure 5:
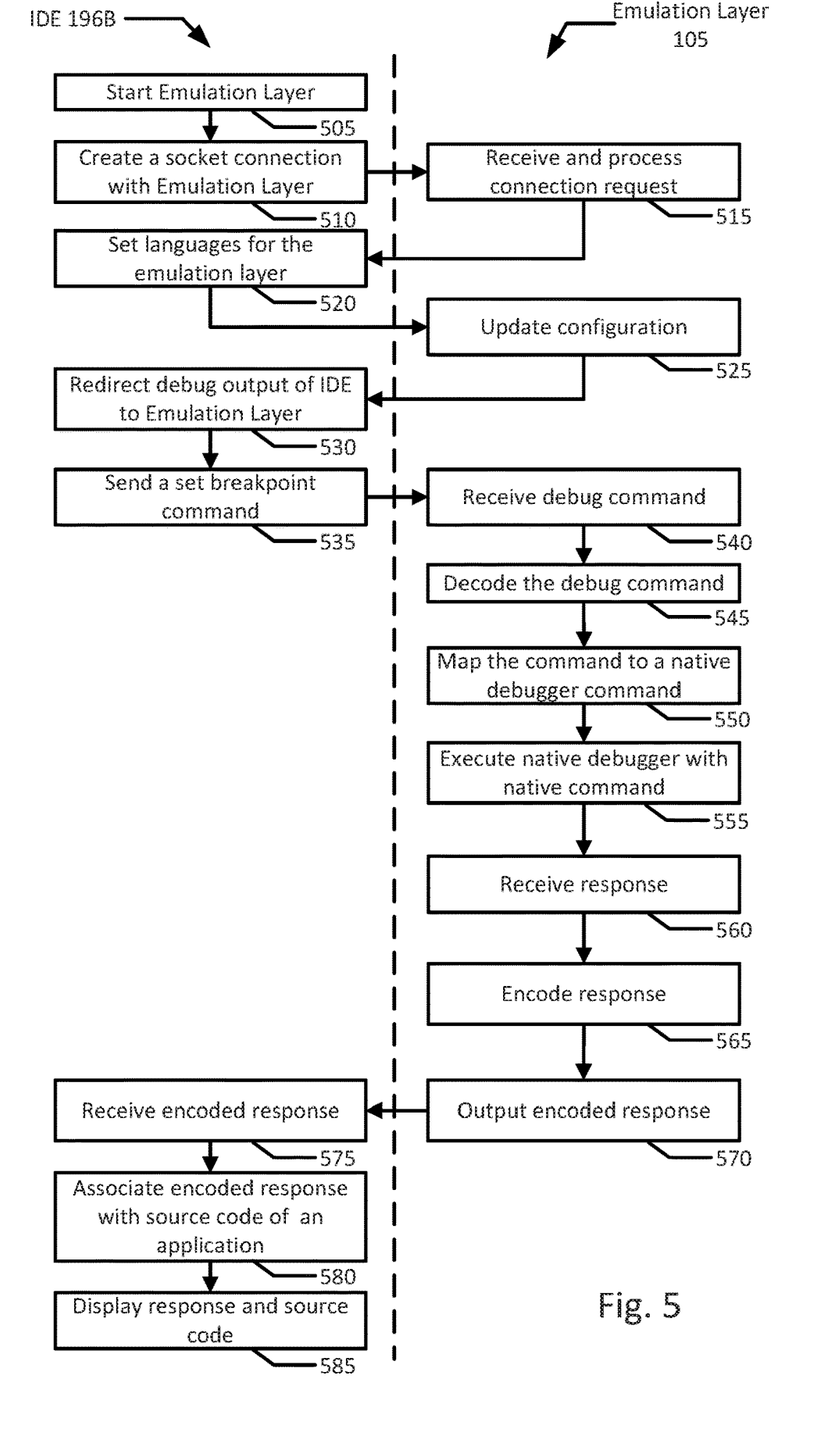
FIG. 5 illustrates a flow diagram of an example method of debugging a native compiled application from an IDE, in accordance with an embodiment of the present disclosure.

FIG. 5 illustrates a flow diagram of an example method of processing debugging a native compiled application from an Integrated Development Environment (IDE), in accordance with an embodiment of the present disclosure. Although the example method 500 is described with reference to the flow diagram illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. For example, in the illustrated flow diagram, an IDE 196B on VM 170B is in communication with the emulation layer 105 on server 180 when debugging the native compiled application 125.

As shown in FIG. 5, the IDE 196B starts the emulation layer 105 (Block 505) and creates a socket connection between the IDE 196B and the emulation layer 105. When the emulation layer 105 receives the socket connection request, the emulation layer 105 processes the connection request (block 515). Next, the IDE 196B is initialized and configured to use the emulation layer 105. The IDE 196A sets the languages for the emulation layer 105 (block 520). For example, the emulation layer 105 may be configured to receive Java bytecode from the IDE 196B and use native CPU instructions with native debugger 115 and native compiled application 125. The emulation layer 105 updates its configuration (block 525). In at least one example, the emulation layer may include various encoders and decoders configured to translate debug commands. In some examples, a debug command may be received using a java debug wire protocol, primarily used with a Java virtual machine, and translated to native CPU instructions (e.g., RISC, CISC, VLIW, and EPIC architectures). The IDE 196B redirects debugging outputs towards the emulation layer 105 (block 530). For example, a Java configured IDE generally is configured to direct JDWP commands towards a Java Virtual Machine (JVM). However when configured to run in a native compiled configuration, debug commands are rerouted to an emulation layer 105 to communicate with the native debugger 115 and the native compiled application.

During debugging of the native compiled application 125, the IDE 196B sends a set breakpoint command to the emulation layer 105 (Block 535). Upon receiving the debug command at the emulation layer 105 (block 540), the debug command is decoded (block 545). For example, in some instances a debug command may include one or more parameters and a reference to the native compiled application 125. In these instances, the reference enables the emulation layer 105 to execute the native compiled application 125 using the native debugger 115. Next, the emulation layer 105 maps the command to a native debugger command (block 550) and executes the native debugger 115 with the native debug command 107 (Block 555). The emulation layer 105 receives a response from the native debugger 115 (block 560) and encodes the response (block 565) for the IDE 196B. Once encoded, the emulation layer 105 outputs the encoded response (block 570). Upon receiving the encoded response at the IDE 196B (block 575), the IDE 196A associates the response with the source code 155 of the application 198A and displays the response with respect to the source code 155.

Figure 6:
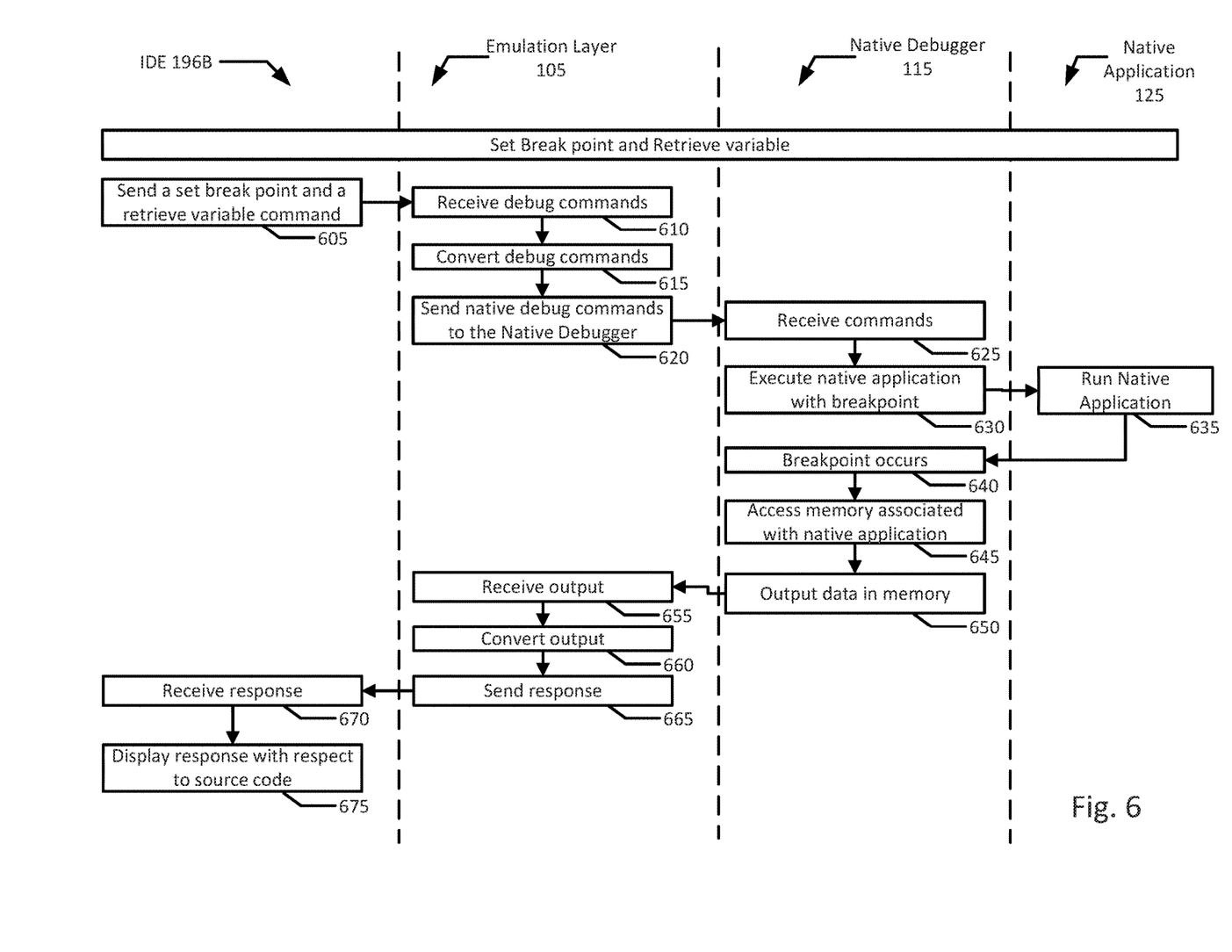
FIG. 6 illustrates a flow diagram of an example method of retrieving debug data from a native compiled application, in accordance with an embodiment of the present disclosure.

FIG. 6 illustrates a flow diagram of an example method of retrieving debug data from a native compiled application, in accordance with an embodiment of the present disclosure. Although the example method 600 is described with reference to the flow diagram illustrated in FIG. 6, it will be appreciated that many other methods of performing the acts associated with the method 600 may be used. For example, the order of some of the blocks may be changed, certain blocks may be combined with other blocks, blocks may be repeated, and some of the blocks described are optional. For example, in the illustrated flow diagram, an IDE 196B on VM 170B is in communication with the emulation layer 105 on server 180 when debugging the native compiled application 125.

As shown, the IDE 196B sends a "set break point" and a "retrieve variable" command to the emulation layer 105 (block 605). Upon receiving the debug commands 158 (block 610), the emulation layer 105 converts the debug commands 158 to native debug commands 107 (block 615). Next, the emulation layer 105 sends the native debug commands 107 to the native debugger 115 (block 620). For example, when the emulation layer 105 invokes the native debugger 115, the native debugger 115 executes the native compiled application 125 with the native debug commands 107. The native debugger 115 receives the native debugger commands 107 (block 625) and executes the native application 125 with the breakpoint set (block 630). The native application 125 executes until the breakpoint is reached (block 635), at which point the native application 125 returns control back to the native debugger 115 (block 640). The native debugger 115 accesses memory associated with the native application 125 (block 645) and outputs the data in memory (block 650). For example, once at a break point, the native debugger 115 can access the memory space of the native application 125 and retrieve various portions of data. In some instances, the native debugger 115 may retrieve values of variables and/or memory states. Upon receiving the output from the native debugger (block 655), the emulation layer 105 converts the output to a first language understandable by the IDE 196B (block 660) and sends the response to the IDE 196B (block 665). Upon receiving the response (block 670), the IDE 196B displays the response with respect to the source code 155 (Block 675).

Figure 7:
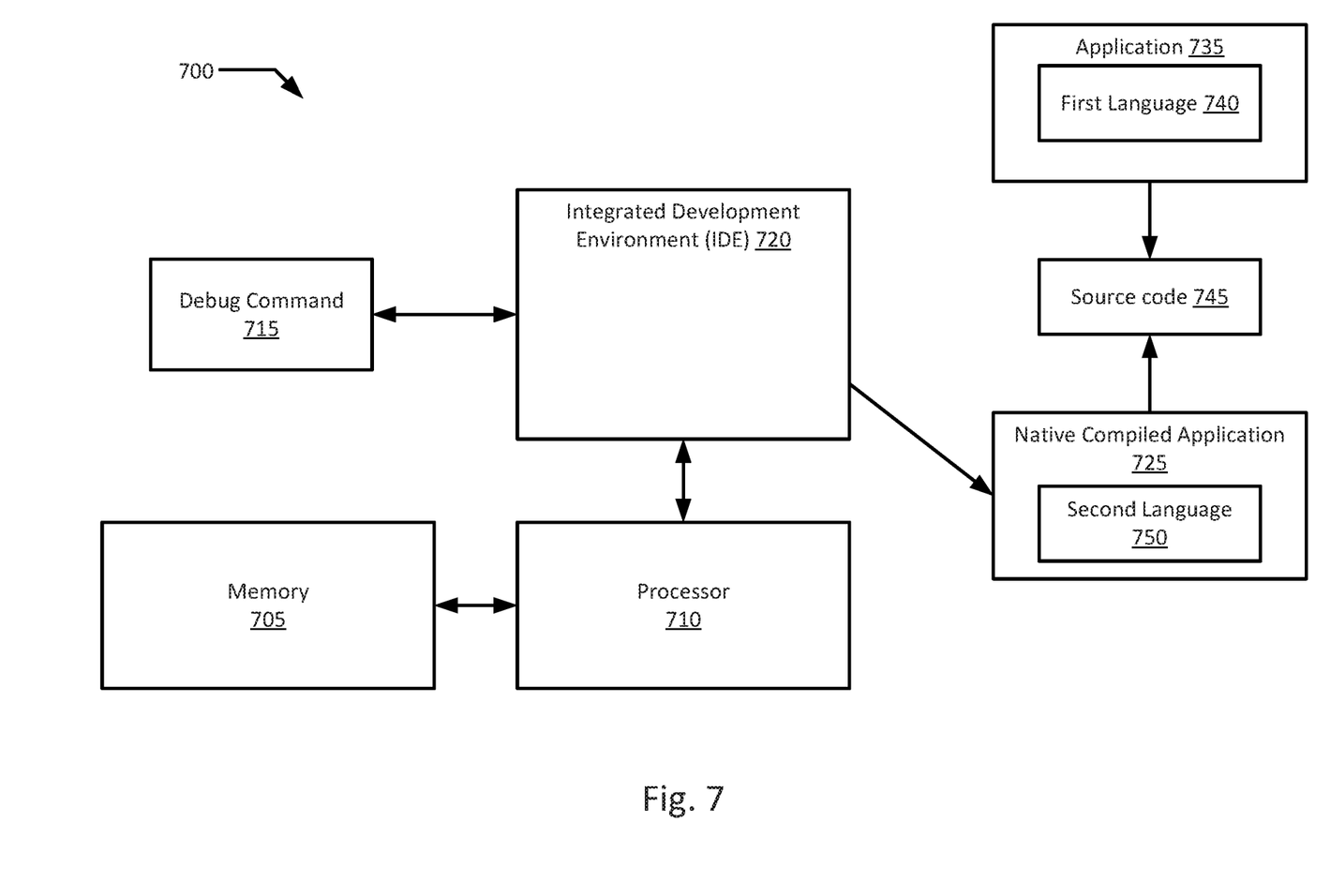
FIG. 7 illustrates a block diagram of an example system for debugging a native compiled application according to an example embodiment of the present disclosure.

FIG. 7 is a block diagram of system 700 which includes memory 705 and processor 710. The processor 710 is in communication with the memory 705. The processor 710 provides an integrated development environment (IDE) 720 configured to debug an application 735 compiled into a first language 740, where the application 735 is associated with the source code 745. The IDE 720 is configured to debug a native compiled application 725 in a second language 750 and the native compiled application 725 is also associated with the source code 745 of application 735. The processor 710 sends a debug command 715 to the native compiled application 725 using the IDE 720.

Figure 8:
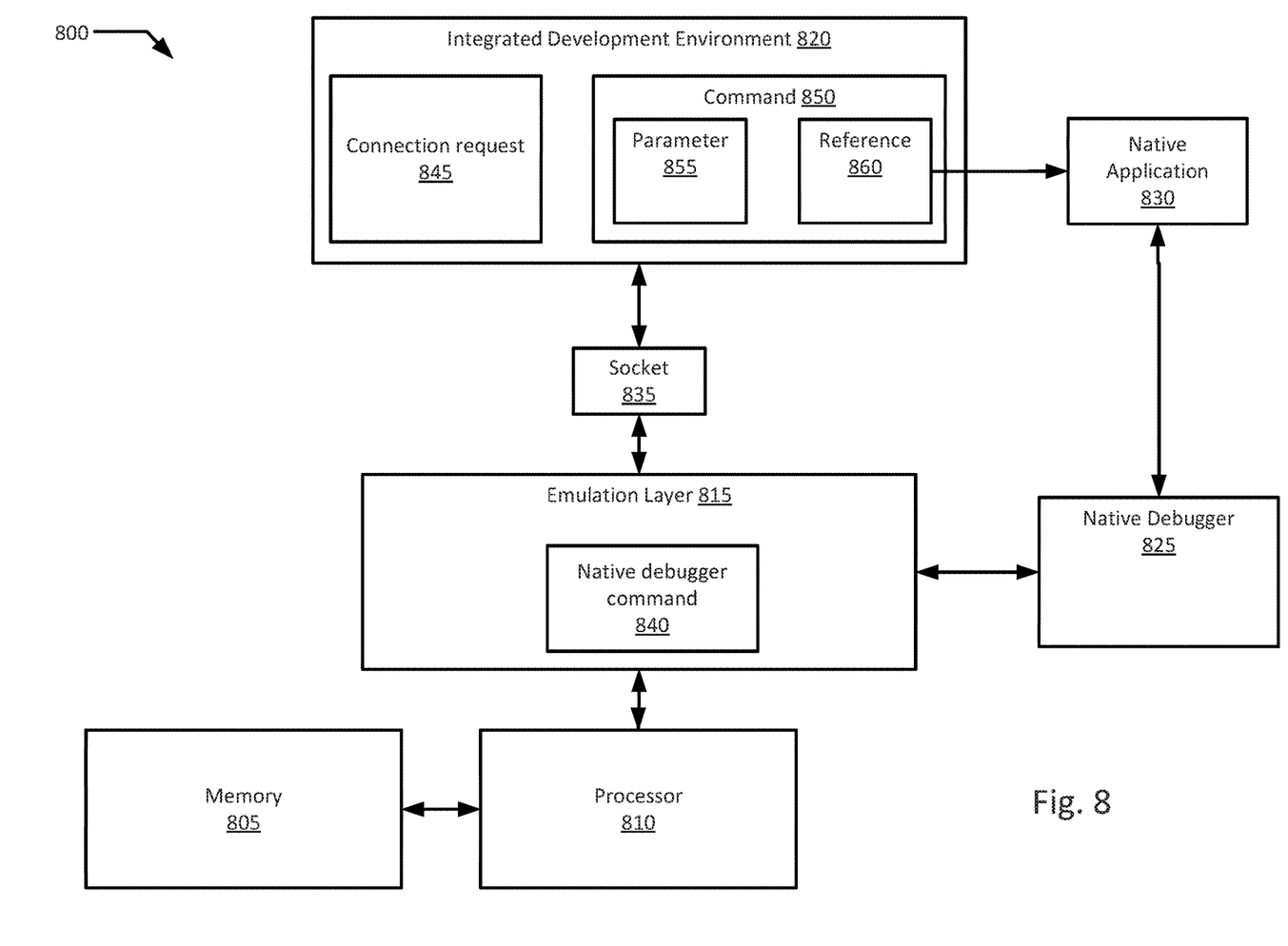
FIG. 8 illustrates a block diagram of an example system debugging a native application using an emulation layer according to an example embodiment of the present disclosure.

FIG. 8 is a block diagram of system 800, which includes memory 805 and processor 810. The processor 810 is in communication with the memory 805. The processor 810 is configured to perform receiving a connection request 845 at an emulation layer 815 from an integrated development environment (IDE) 820. The IDE 820 connects to the emulation layer 815 via a socket 835. The emulation layer 815 receives a command 850 via the socket 835. The emulation layer 815 decodes the command 850 to retrieve a parameter 855 and a reference 860 to the native application 830. The emulation layer 815 maps the command 850 to a native debugger command 840 and invokes a native debugger 825 to execute the native application 830 using the native debugger command 840 and parameters 855 as inputs.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more aspects described herein. In a 1st exemplary aspect of the present disclosure, a method includes providing an integrated development environment (IDE) configured to debug an application compiled into a first language, wherein the application is associated with source code, configuring the IDE to debug a native compiled application in a second language, wherein the native compiled application is associated with the source code of the application, and sending a debug command to the native compiled application using the IDE.

In a 2nd exemplary aspect of the present disclosure, which may be used in combination with any one or more of the preceding aspects (i.e., the 1st aspect), the method further includes wherein configuring comprises instantiating an emulation layer, providing a reference to the native compiled application to the emulation layer, setting a emulation layer to translate commands between the native compiled application and the IDE using the first language and the second language, and redirecting debugging output of the IDE to the emulation layer.

In a 3rd exemplary aspect of the present disclosure, which may be used in combination with any one or more of the preceding aspects (i.e., the 2nd aspect), the method further includes wherein the IDE connects to the emulation layer via a socket.

In a 4th exemplary aspect of the present disclosure, which may be used in combination with any one or more of the preceding aspects (i.e., the 2nd aspect), the method further includes wherein the emulation layer invokes a native debugger to send the debug commands to the native compiled application.

In a 5th exemplary aspect of the present disclosure, which may be used in combination with any one or more of the preceding aspects (i.e., the 1st aspect), the method further includes receiving output based on the debug command from the native compiled application, wherein the output correlates to the source code of the application.

In a 6th exemplary aspect of the present disclosure, which may be used in combination with any one or more of the preceding aspects (i.e., the 1st aspect), the method further includes wherein the debug command is a break point within the source of the application which, when sent by the IDE, causes the native compiled application to break at a point corresponding to the source code.

In a 7th exemplary aspect of the present disclosure, which may be used in combination with any one or more of the preceding aspects (i.e., the 1st aspect), the method further includes wherein the first language is Java bytecode and the second language is native CPU instructions.

Aspects of the subject matter described herein may be useful alone or in combination with one or more aspects described herein. In a 8th exemplary aspect of the present disclosure, a system includes memory and a processor. The processor is in communication with the memory, where the processor is configured to perform providing an integrated development environment (IDE) configured to debug an application compiled into a first language, wherein the application is associated with source code, configuring the IDE to debug a native compiled application in a second language, wherein the native compiled application is associated with the source code of the application, and sending a debug command to the native compiled application using the IDE.

In a 9th exemplary aspect of the present disclosure, which may be used in combination with any one or more of the preceding aspects (i.e., the 8th aspect), where configuring includes instantiating an emulation layer, providing a reference to the native compiled application to the emulation layer, setting a emulation layer to convert commands between the native compiled application and the IDE using the first language and the second language, and redirecting debugging output of the IDE to the emulation layer.

In a 10th exemplary aspect of the present disclosure, which may be used in combination with any one or more of the preceding aspects (i.e., the 9th aspect), where the IDE connects to the emulation layer via a socket.

In a 11th exemplary aspect of the present disclosure, which may be used in combination with any one or more of the preceding aspects (i.e., the 9th aspect), where the emulation layer invokes a native debugger to send the debug commands to the native compiled application.

In a 12th exemplary aspect of the present disclosure, which may be used in combination with any one or more of the preceding aspects (i.e., the 8th aspect), where the processor is further configured to perform receiving output based on the debug command from the native compiled application, wherein the output correlates to the source code of the application.

In a 13th exemplary aspect of the present disclosure, which may be used in combination with any one or more of the preceding aspects (i.e., the 8th aspect), where the system further includes a compiler configured to compile the application into the native compiled application.

Aspects of the subject matter described herein may be useful alone or in combination with one or more aspects described herein. In a 14th exemplary aspect of the present disclosure, a non-transitory machine readable medium storing code, which when executed by a processor is configured to provide an integrated development environment (IDE) configured to debug an application compiled into a first language, wherein the application is associated with source code; configure the IDE to debug a native compiled application in a second language, wherein the native compiled application is associated with the source code of the application; and send a debug command to the native compiled application using the IDE.

In a 15th exemplary aspect of the present disclosure, which may be used in combination with any one or more of the preceding aspects (i.e., the 14th aspect), where configure comprises: instantiate an emulation layer; provide a reference to the native compiled application to the emulation layer; set a emulation layer to translate commands between the native compiled application and the IDE using the first language and the second language; and redirect debugging output of the IDE to the emulation layer.

In a 16th exemplary aspect of the present disclosure, which may be used in combination with any one or more of the preceding aspects (i.e., the 15th aspect), where the IDE connects to the emulation layer via a socket.

In a 17th exemplary aspect of the present disclosure, which may be used in combination with any one or more of the preceding aspects (i.e., the 15th aspect), where the emulation layer invokes a native debugger to send the debug commands to the native compiled application.

In a 18th exemplary aspect of the present disclosure, which may be used in combination with any one or more of the preceding aspects (i.e., the 14th aspect), where the code, when executed, is further configured to receive output based on the debug command from the native compiled application, wherein the output correlates to the source code of the application.

In a 19th exemplary aspect of the present disclosure, which may be used in combination with any one or more of the preceding aspects (i.e., the 14th aspect), where the debug command is a break point within the source of the application which, when sent by the IDE, causes the native compiled application to break at a point corresponding to the source code.

In a 20th exemplary aspect of the present disclosure, which may be used in combination with any one or more of the preceding aspects (i.e., the 14th aspect), where the first language is Java bytecode and the second language is native CPU instructions.

Aspects of the subject matter described herein may be useful alone or in combination with one or more aspects described herein. In a 21st exemplary aspect of the present disclosure, a system includes a means for providing an integrated development environment (IDE) configured to debug an application compiled into a first language, wherein the application is associated with source code; a means for configuring the IDE to debug a native compiled application in a second language, wherein the native compiled application is associated with the source code of the application; and a means for sending a debug command to the native compiled application using the IDE.

Aspects of the subject matter described herein may be useful alone or in combination with one or more aspects described herein. In a 22nd exemplary aspect of the present disclosure, a system includes a memory and a processor in communication with the memory, wherein the processor is configured to perform: receiving a connection request at an emulation layer from an integrated development environment (IDE); connecting, via a socket connection, the emulation layer with the IDE; receiving a command at the emulation layer, via the socket connection; decoding the command to retrieve a parameter and a reference to a native application; mapping the command to a native debugger command; and invoking a native debugger to execute the native application using the native debugger command and the parameter as inputs.

In a 23rd exemplary aspect of the present disclosure, which may be used in combination with any one or more of the preceding aspects (i.e., the 22nd aspect), where the processor is further configured perform: receiving a response from the native debugger; encoding the response from a debugger command from the second language to a corresponding debugger command from a first language; and sending, via the socket connection, the encoded response to the IDE.

In a 24th exemplary aspect of the present disclosure, which may be used in combination with any one or more of the preceding aspects (i.e., the 22nd aspect), where the command is a request for a break point at a location specified by the parameter.

In a 25th exemplary aspect of the present disclosure, which may be used in combination with any one or more of the preceding aspects (i.e., the 22nd aspect), where the command is a request for data at a location specified by the parameter.

In a 26th exemplary aspect of the present disclosure, which may be used in combination with any one or more of the preceding aspects (i.e., the 22nd aspect), where decoding comprises converting the parameter from a first language to a second language.

In a 27th exemplary aspect of the present disclosure, which may be used in combination with any one or more of the preceding aspects (i.e., the 26th aspect), where the first language is bytecode.

In a 28th exemplary aspect of the present disclosure, which may be used in combination with any one or more of the preceding aspects (i.e., the 26th aspect), where the second language is native CPU instructions.

In a 29th exemplary aspect of the present disclosure, which may be used in combination with any one or more of the preceding aspects (i.e., the 22nd aspect), where the command is a debug wire protocol command.

Aspects of the subject matter described herein may be useful alone or in combination with one or more aspects described herein. In a 30th exemplary aspect of the present disclosure, a method includes receiving a command at the emulation layer; converting the command from a first language to a native debugger command; executing a native application using the native debugger command as an input of a native debugger; receiving a response from the native debugger; converting the response to the first language; and outputting the converted response.

In a 31st exemplary aspect of the present disclosure, which may be used in combination with any one or more of the preceding aspects (i.e., the 30th aspect), where converting the command comprises decoding the command to retrieve a parameter and a reference to a native application; and mapping the command to the native debugger command.

In a 32nd exemplary aspect of the present disclosure, which may be used in combination with any one or more of the preceding aspects (i.e., the 31st aspect), where the command is a request for a break point at a location specified by the parameter.

In a 33rd exemplary aspect of the present disclosure, which may be used in combination with any one or more of the preceding aspects (i.e., the 31st aspect), where the command is a request for data at a location specified by the parameter.

In a 34th exemplary aspect of the present disclosure, which may be used in combination with any one or more of the preceding aspects (i.e., the 30th aspect), where the first language is bytecode.

In a 35th exemplary aspect of the present disclosure, which may be used in combination with any one or more of the preceding aspects (i.e., the 30th aspect), where the command is a debug wire protocol command.

Aspects of the subject matter described herein may be useful alone or in combination with one or more aspects described herein. In a 36th exemplary aspect of the present disclosure, a non-transitory machine readable medium storing code, which when executed by a processor is configured to receive a command at the emulation layer, via a socket connection; decode the command to retrieve a parameter and a reference to a native application; map the command to a native debugger command; and invoke a native debugger to execute the native application using the native debugger command and the parameter as inputs.

In a 37th exemplary aspect of the present disclosure, which may be used in combination with any one or more of the preceding aspects (i.e., the 36th aspect), where the code, when executed by a processor, is further configured to: receive a response from the native debugger; encode the response from a debugger command from a second language to debugger command from a first language; and send, via the socket connection, the encoded response.

In a 38th exemplary aspect of the present disclosure, which may be used in combination with any one or more of the preceding aspects (i.e., the 36th aspect), where the command is a request for a break point at a location specified by the parameter.

In a 39th exemplary aspect of the present disclosure, which may be used in combination with any one or more of the preceding aspects (i.e., the 36th aspect), where the command is a request for data at a location specified by the parameter.

In a 40th exemplary aspect of the present disclosure, which may be used in combination with any one or more of the preceding aspects (i.e., the 36th aspect), where decoding comprises converting the parameter from a first language to a second language.

In a 41st exemplary aspect of the present disclosure, which may be used in combination with any one or more of the preceding aspects (i.e., the 40th aspect), where the first language is bytecode.

In a 42nd exemplary aspect of the present disclosure, which may be used in combination with any one or more of the preceding aspects (i.e., the 40th aspect), where the second language is native CPU instructions.

In a 43rd exemplary aspect of the present disclosure, which may be used in combination with any one or more of the preceding aspects (i.e., the 36th aspect), where the command is a Java debug wire protocol command.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
    a memory; and
    a processor in communication with the memory, wherein the processor is configured to perform:
        receiving a connection request at an emulation layer from an integrated development environment (IDE) that is configured to develop and debug programs in an interpreted programming language;
        connecting, via a socket connection, the emulation layer with the IDE;
        setting, by the IDE, languages of the emulation layer, the languages comprising a first language and a second language, wherein the first language is used between the IDE and the emulation layer, and the second language is used between the emulation layer and a native debugger and a natively compiled application;
        receiving, at the emulation layer, via the socket connection, a command in the first language, to perform debugging on the natively compiled application;
        decoding the command to retrieve a parameter and a reference to the natively compiled application;
        mapping the command to a native debugger-command in the second language; and
        invoking the native debugger to execute the natively compiled application using the native debugger command and the parameter as inputs.

2. The system of claim 1, wherein the processor is further configured to perform:
    receiving a response from the native debugger;
    encoding the response from a debugger command in the second language to a corresponding debugger command in the first language; and
    sending, via the socket connection, the encoded response to the IDE.

3. The system of claim 1, wherein the command is a request for a break point at a location specified by the parameter.

4. The system of claim 1, wherein the command is a request for data at a location specified by the parameter.

5. The system of claim 1, wherein decoding comprises converting the parameter from the first language to the second language.

6. The system of claim 5, wherein the first language is bytecode.

7. The system of claim 5, wherein the second language is native CPU instructions.

8. The system of claim 1, wherein the command is a debug wire protocol command.

9. A method, comprising:
- receiving, from an integrated development environment (IDE), at an emulation layer, a command to perform debugging on bytecode compiled from source code of a natively compiled application, the IDE configured to develop and debug programs in an interpreted programming language;
- setting, by the IDE, languages of the emulation layer, the languages comprising a first language and a second language, wherein the first language is used between the IDE and the emulation layer, and the second language is used between the emulation layer and a native debugger and a natively compiled application;
- converting, the command from the first language to a native debugger command in the second language;
- executing the natively compiled application using the native debugger command as an input of a native debugger, wherein both the bytecode and the natively compiled application are compiled from the same source code;
- receiving a response from the native debugger in the second language;
- converting the response to the first language; and
- outputting the converted response.

10. The method of claim 9, wherein converting the command comprises:
- decoding the command to retrieve a parameter and a reference to the native application; and
- mapping the command to the native debugger command.

11. The method of claim 10, wherein the command is a request for a break point at a location specified by the parameter.

12. The method of claim 10, wherein the command is a request for data at a location specified by the parameter.

13. The method of claim 9, wherein the first language is bytecode.

14. The method of claim 9, wherein the command is a debug wire protocol command.

15. A non-transitory machine readable medium storing code, which when executed by a processor is configured to:
- receive, from an integrated development environment (IDE), at an emulation layer, via a socket connection, a command in a first language to perform debugging on a natively compiled application, the IDE configured to develop and debug programs in an interpreted programming language;
- set, by the IDE, languages of the emulation layer, the languages comprising the first language and a second language, wherein the first language is used between the IDE and the emulation layer, and the second language is used between the emulation layer and a native debugger and a natively compiled application;
- decode the command to retrieve a parameter and a reference to the native application;
- map the command to a native debugger command in the second language; and
- invoke a native debugger to execute the native application using the native debugger command and the parameter as inputs.

16. The non-transitory machine readable medium of claim 15, wherein the code, when executed by a processor, is further configured to:
- receive a response from the native debugger in the second language;
- encode the response from a debugger command from the second language to a debugger command from the first language; and
- send, via the socket connection, the encoded response.

17. The non-transitory machine readable medium of claim 15, wherein the command is a request for a break point at a location specified by the parameter.

18. The non-transitory machine readable medium of claim 15, wherein the command is a request for data at a location specified by the parameter.

19. The non-transitory machine readable medium of claim 15, wherein decoding comprises:
- converting the parameter from the first language to the second language.

20. The non-transitory machine readable medium of claim 19, wherein the first language is bytecode.

* * * * *